United States Patent [19]
Labrot et al.

[11] 3,762,908
[45] Oct. 2, 1973

[54] FLOATGLASS PROCESSING EQUIPMENT

[75] Inventors: Günter Labrot, Porz; Karl Kaes, Porz-Wahn, both of Germany

[73] Assignee: Erste Deutsche Floatgias, GmbH & Co. OHG, Porz, Germany

[22] Filed: Nov. 25, 1969

[21] Appl. No.: 879,856

[30] Foreign Application Priority Data
Aug. 2, 1968  Germany................... P 19 39 383.0

[52] U.S. Cl. ............................. 65/158, 65/182 R
[51] Int. Cl............................................... C03b 5/16
[58] Field of Search............................ 49/465, 466; 292/242, 258, 259; 65/29, 27, 65 A, 99 A, 182, 158

[56] References Cited
UNITED STATES PATENTS
2,793,063   5/1957   Hurley ............................... 292/259
3,473,905   10/1969  Jago et al............................. 65/27
2,599,527   6/1952   Badger........................... 292/259 X Primary Examiner—Arthur D. Kellogg
Attorney—Irving M. Weiner

[57] ABSTRACT

The specification describes a closure in the wall of a float glass producing plant. The closure comprises a tubular ring extending from the wall in an outward direction, a lid placed over the outer end of the ring, holding means engaging projections on the outer end of the ring, and clamping means mounted on the holding means for holding the lid against the end of the ring.

3 Claims, 2 Drawing Figures

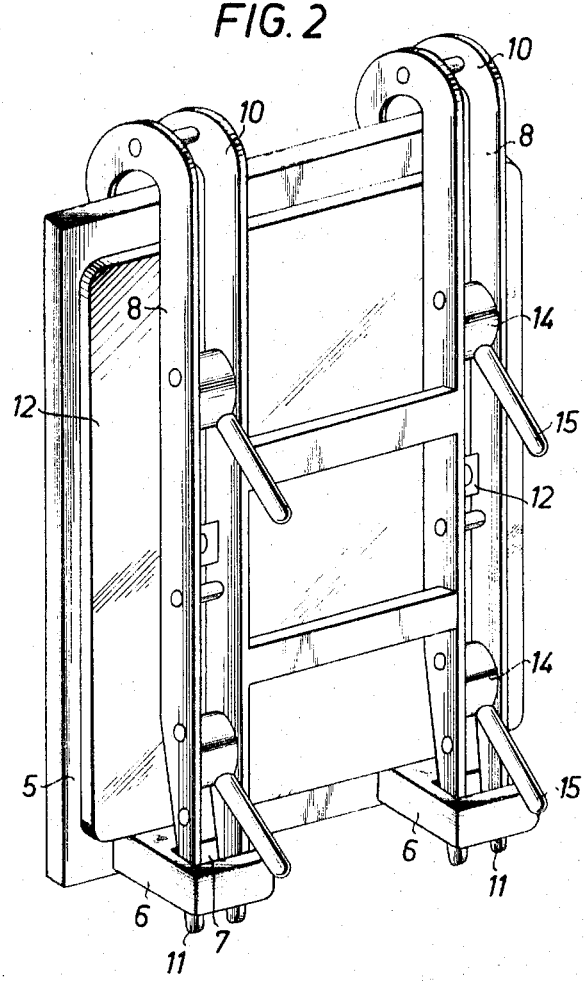

3,762,908

FLOATGLASS PROCESSING EQUIPMENT

BACKGROUND OF THE INVENTION

1. Field of Invention

The invention relates to inspection windows in the wall of float glass processing chambers or containers containing an atmosphere free of oxygen, and more specifically to means for sealing such a window.

2. Description of the Prior Art

In the production of sheet glass in the float method molten glass is set on the surface of a bath of liquid method such as tin. On this metal the glass spreads out to form a layer of even thickness which is drawn over the tin bath in the form of a continuous strip. As soon as the strip has become sufficiently solid it is raised from the tin bath. In operation the molten tin has temperatures between 600° and 1,000°C. and at such temperatures has a high affinity for oxygen. Oxidation of tin must, however, be avoided at all costs since tin oxide even in extremely low quantities leads to undesired flaws on the glass strip or plate. Therefore a protective gas atmosphere is maintained over the tin bath.

However, even if, as is generally the case, the protective gas is introduced into the tin bath container with a pressure above atmospheric pressure, any defects in the sealing of the plant will lead to oxygen penetrating as far as the float bath because the diffusion of oxygen is determined by the partial pressure relationship of oxygen, whose partial pressure in the tin bath container is negligibly small. In order to avoid the penetration of oxygen it is therefore necessary for the whole tin bath container to be hermetically sealed off from the outside atmosphere.

Openings in the side walls of the tin bath container, through which the float bath can be observed and through which the necessary operations are carried out in the container during production have in prior art arrangements either been filled with refractory blocks and the joints sealed with refractory mortar, or the openings were directly closed by welding if they did not have to be used. Although welding leads to an absolute sealing action, this method has the disadvantage that the cutting out of the inserted piece of material which has been welded in position takes an excessive time, if such a removal should be necessary. On the other hand, the blocks sealed with refractory mortar must be continuously sealed afresh since in the given condition the sealing material continuously splits or crumbles. Both methods of sealing have the disadvantage that they are tedious and time-consuming. There is the further disadvantage that during the time in which the sealing is carried out oxygen penetrates into the float glass container.

SUMMARY OF THE INVENTION

One object of the present invention is to provide a sealing arrangement which is particularly suitable for the purposes indicated and can be used for inspection or working openings. A further particular object of the invention is to make possible a rapid opening and closing and a hermetic sealing of the float bath container.

A still further object of the invention is to construct the sealing arrangement in such a manner that it is possible to use sealing materials which could not previously be used owing to the high temperatures involved.

In accordance with one aspect the invention consists in that the opening is surrounded by a heat dissipator or metal ring which extends from the container wall outwards and at its free end is provided with projections with which a holding means spanning the metal ring is connected, the holding means being provided with eccentrics for holding a sealing lid against a sealing flange on the metal ring.

By a simple swivelling of levers forming part of the device the closing cover or lid can thus be released and the holding means an the lid removed with one simple manual movement from the inspection opening, or replaced to close the inspection opening. By the extension of the metal ring welded on the housing or container of float bath in an outward direction sufficient space for manipulation without impediment is provided and simultaneously there is the advantage that the sealing face itself has a low temperature so that suitable materials can be used for the sealing ring.

Instead of the eccentric provided with the actuating levers it is possible to use, for pressing the closing lid into position, suitably constructed pressing screws or the like.

Further developments of the new sealing arrangement, which also form part of the invention, will be found in the following specific description and the claims.

BRIEF DESCRIPTION OF THE DRAWINGS

The invention will now be described with reference to the accompanying drawings of which
FIG. 2 is a perpsective view.

DESCRIPTION OF PREFERRED EMBODIMENT

Figure 1:
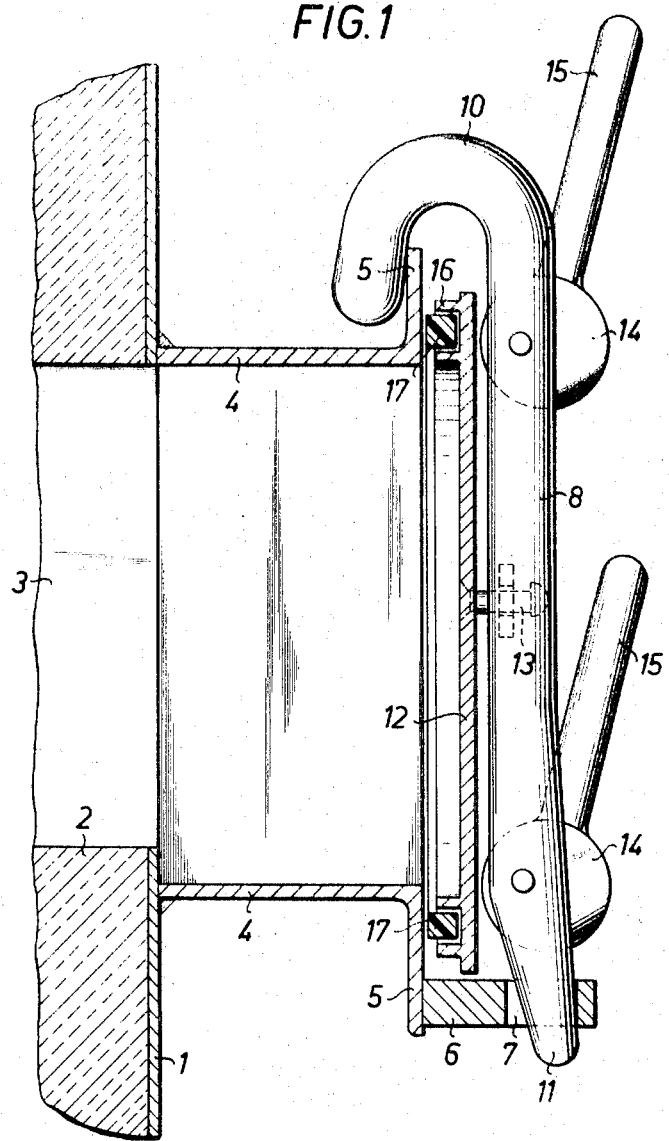
FIG. 1 is a cross section.

On the outer sheet metal cladding 1 of the tin bath container 2 a heat dissipator or metal ring 4 has one end thereof around and overlying the opening 3 arranged in the container wall. At its free end it has an outwardly extending or out-turned flange 5. On the bottom part of the flange 5, eyes 6 are welded in whose openings 7 a hanger or holding frame of the closure lid 12 or cover is inserted.

The holding frame of the closure lid or cover which overlies the other end of the ring consists of pieces of flat steel strip 8 which are connected by the pieces of steel rod. The top end parts of the strips 8 are bent at 10 round and then downwards in the form of hooks so as to fit behind and engage the flange 5, while the lower ends extensions 11 are fitted into the eyes 6 to abut thereagainst. In this manner the eyes 6 define abutment means formed on and below the ring.

The closure lid or cover 12 is connected by means of a pin 13 with the holding frame. The connection allows sufficient play for the lid 12 to be moved horizontally or broadside in relation to the holding frame. The lid is pressed or clamped by means of the eccentrics or cams 14, which can be turned by means of the levers 15, against the flange 5.

The closure lid 12 is provided with a seal 17 (in groove 16) constituted by a ring of elastic synthetic resin or plastics material which does not allow the diffusion of gas. As a material for the ring, silicone rubber has been found particularly suitable. The use of such diffusion-proof synthetic resins is made possible since the metal ring 4, which extends away from the container, enables a large amount of heat to be dissipated so that the flange 5, against which the sealing ring abuts, does not reach excessively high temperatures.

We claim:
1. In a glass manufacturing furnace having an external wall with an opening therethrough, an improved closure therefor comprising:
- an open-ended heat dissipating metal ring affixed at one end thereof to said wall externally of the furnace and in overlying relation to the opening, said ring having an out-turned flange on its other end,
- a hanger overlying said other end of said ring and having upper hooked end portions extending over and engaging behind said flange to support said hanger on said ring, abutment means on and below said ring,

- extensions on said hanger extending therebelow and engaging said abutment means, said abutment means and said hooks holding said hanger against movement away from said other end of said ring,
- a lid overlying said other end of said ring between said hanger and said hook portions and slidably mounted on said hanger to move in broadside relation to said flange,
- an annular seal member consisting essentially of a diffusion-proof synthetic resin carried by said lid between said lid and said flange, and
- clamping means mounted on said hanger and operable to engage and urge said lid toward said flange to displace said seal member against flange such that when the clamping means urges the seal against the flange the closure is hermetically sealed to prevent the diffusion of gas.

2. In a furnace as defined by claim 1, wherein said clamping means includes laterally spaced pairs of cams mounted on said frame.

3. In a furnace as defined by claim 1, wherein said seal member is made of a silicone rubber.

* * * * *

PO-1050
(5/69)

UNITED STATES PATENT OFFICE
CERTIFICATE OF CORRECTION

Patent No. 3,762,908     Dated October 2, 1973

Inventor(s) Gunter LABROT and Karl KAES

It is certified that error appears in the above-identified patent and that said Letters Patent are hereby corrected as shown below:

On the title sheet, left column, after "[30] Foreign Application Priority Data", change "Aug. 2, 1968   Germany............P 19 39 383.0" to --Aug. 2, 1969   Germany............P 19 39 383.0--.

Signed and sealed this 1st day of October 1974.

(SEAL)
Attest:

McCOY M. GIBSON JR.
Attesting Officer

C. MARSHALL DANN
Commissioner of Patents